(12) United States Patent
Suzuki et al.

(10) Patent No.: US 11,433,637 B2
(45) Date of Patent: Sep. 6, 2022

(54) HEAT SHIELD COMPONENT

(71) Applicant: Nissan Motor Co., Ltd., Yokohama (JP)

(72) Inventors: Yuka Suzuki, Kanagawa (JP); Yutaka Mabuchi, Kanagawa (JP); Takuma Suzuki, Kanagawa (JP); Ken Tsutsuji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 315 days.

(21) Appl. No.: 16/638,684

(22) PCT Filed: Aug. 14, 2017

(86) PCT No.: PCT/JP2017/029292
§ 371 (c)(1),
(2) Date: Feb. 12, 2020

(87) PCT Pub. No.: WO2019/035163
PCT Pub. Date: Feb. 21, 2019

(65) Prior Publication Data
US 2021/0187909 A1   Jun. 24, 2021

(51) Int. Cl.
*B32B 3/00* (2006.01)
*B32B 15/088* (2006.01)
(Continued)

(52) U.S. Cl.
CPC .............. *B32B 3/00* (2013.01); *B32B 15/088* (2013.01); *B32B 15/20* (2013.01); *C23C 28/042* (2013.01);
(Continued)

(58) Field of Classification Search
CPC . B32B 3/00; B32B 15/088; B32B 2266/0257; B32B 2307/538;
(Continued)

(56) References Cited

U.S. PATENT DOCUMENTS 5,771,873 A * 6/1998 Potter ..................... F01L 3/04
123/668
7,150,921 B2   12/2006 Nelson et al.
(Continued)

FOREIGN PATENT DOCUMENTS

CN          1701951 A    11/2005
CN        105764872 A     7/2016
(Continued)

*Primary Examiner* — Hai Vo
(74) *Attorney, Agent, or Firm* — Young Basile Hanlon & MacFarlane, P.C.

(57) ABSTRACT

A heat shield component includes a substrate, and a heat shield film arranged on the substrate. The heat shield film includes a first layer arranged on the substrate, including pores, and having a thermal conductivity of 0.3 W/(m·K) or less and a volumetric specific heat of 1200 kJ/(m³·K) or less, and a second layer arranged on the first layer to provide closed pores between the first layer and the second layer. The heat shield film has a surface roughness on a top surface which is 1.5 μm Ra or less. The heat shield component can (Continued)

achieve high heat-insulating properties and an improved effect of reducing the emission amount of hydrocarbon in an internal combustion engine, for example.

15 Claims, 3 Drawing Sheets

(51) Int. Cl.
  *B32B 15/20* (2006.01)
  *C23C 28/04* (2006.01)
  *F02F 1/00* (2006.01)
  *B32B 15/08* (2006.01)
(52) U.S. Cl.
  CPC .............. *C23C 28/046* (2013.01); *F02F 1/00* (2013.01); *B32B 15/08* (2013.01); *B32B 2266/0214* (2013.01); *B32B 2266/0257* (2013.01); *B32B 2307/30* (2013.01); *B32B 2307/302* (2013.01); *B32B 2307/538* (2013.01); *Y10T 428/249953* (2015.04); *Y10T 428/249976* (2015.04); *Y10T 428/269* (2015.01)
(58) Field of Classification Search
  CPC . Y10T 428/249953; Y10T 428/249976; Y10T 428/269
  See application file for complete search history.

(56) References Cited

U.S. PATENT DOCUMENTS

| 10,315,961 | B2 | 6/2019 | Tomita et al. | |
|---|---|---|---|---|
| 2003/0129379 | A1 | 7/2003 | Yao et al. | |
| 2005/0260434 | A1 | 11/2005 | Nelson et al. | |
| 2010/0303520 | A1* | 12/2010 | Miyauchi | C08J 9/28 521/64 |
| 2013/0209682 | A1* | 8/2013 | Massingill, Jr. | C09D 7/67 524/588 |
| 2015/0104626 | A1* | 4/2015 | Tomita | C04B 35/486 428/313.9 |
| 2016/0264479 | A1 | 9/2016 | Tomita et al. | |
| 2016/0305037 | A1 | 10/2016 | Tateno | |
| 2019/0001644 | A1* | 1/2019 | Nukada | B32B 17/10 |

FOREIGN PATENT DOCUMENTS

| EP | 2865722 A1 | 4/2015 |
|---|---|---|
| JP | 2005-69008 A | 3/2005 |
| JP | 2010-689 A | 1/2010 |
| JP | 5655813 B2 | 1/2015 |
| JP | 2016-199030 A | 12/2016 |
| WO | 2015/080065 A1 | 6/2015 |
| WO | 2016/163244 A1 | 10/2016 |

* cited by examiner

HEAT SHIELD COMPONENT

TECHNICAL FIELD

The present invention relates to heat shield components. In particular, the present invention relates to a heat shield component having high heat-insulating properties and achieving an effect of greatly reducing the emission amount of hydrocarbon so as to be appropriately used for a device such as an internal combustion engine.

BACKGROUND

Recent efforts have focused on an improvement in thermal efficiency in, for example, an internal combustion engine such that an inner wall surface of a combustion chamber is provided with a thin film having heat-insulating properties so as not to release heat in the combustion chamber.

Japanese Patent 5655813 discloses a method of manufacturing an internal combustion engine provided with a heat shield film partly or entirely on a wall surface facing a combustion chamber. Japanese Patent 5655813 discloses that, when metal material used for a heat shield film is thermal-sprayed to the wall surface, a concentration of inert gas during the thermal spray is changed stepwise, so as to provide a plurality of layers including metal and a metal oxide to be stacked on one another. The heat shield film disclosed in Japanese Patent 5655813 is manufactured such that a content ratio of the metal oxide is the smallest in the layer closest to the wall surface, and is increased as the layer is separated from the wall surface.

Conventional internal combustion engines occasionally emit hydrocarbon (HC) because of incomplete combustion of fuel such as gasoline. The emission amount of hydrocarbon, which causes photochemical smog together with an ultraviolet component of sunlight, is thus required to be reduced.

The internal combustion engine provided with the heat shield film made of the metal material thermal-sprayed on the wall surface as disclosed in Japanese Patent 5655813, fails to achieve the effect of sufficiently reducing the amount of hydrocarbon in exhaust gas.

Such an internal combustion engine, however, still needs to have higher heat-insulating properties of the inner wall of the combustion chamber so as to improve thermal efficiency.

SUMMARY

To solve the conventional problems described above, the present invention provides a heat shield component having high heat-insulating properties and achieving an effect of greatly reducing the emission amount of hydrocarbon.

A heat shield component according to an aspect of the present invention includes a substrate and a heat shield film. The heat shield film includes a first layer having a thermal conductivity and a volumetric specific heat each set to a predetermined value or lower, and a second layer arranged to provide closed pores between the first layer and the second layer. A surface roughness on a top surface of the heat shield film is set to a predetermined value or lower.

DETAILED DESCRIPTION

Figure 1:
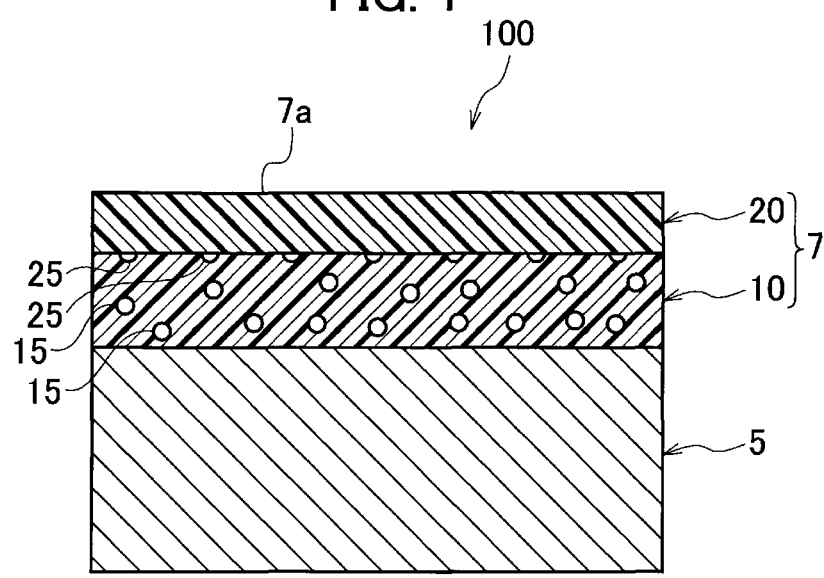
FIG. 1 is a cross-sectional view illustrating an example of a heat shield component according to the present embodiment.

A heat shield component according to the present embodiment will be described below with reference to the drawings. The dimensions of elements in the drawings may be exaggerated for illustration purposes, and are not necessarily drawn to scale.

[Heat Shield Component]

As shown in FIG. 1, a heat shield component 100 according to the present embodiment includes a substrate 5, and a heat shield film 7 arranged on the substrate 5. The heat shield film 7 includes a first layer 10 and a second layer 20. The heat shield component 100 including the heat shield film 7 according to the present embodiment can block external heat transmitted to the substrate 5. The respective elements are described in detail below.

<Substrate 5>

A material included in the substrate 5 is determined as appropriate, and may be metal such as aluminum, magnesium, and iron. The shape and the thickness of the substrate 5 may be determined as appropriate depending on the purpose.

<First Layer 10>

The first layer 10 is arranged on the substrate 5. The first layer 10 may be directly formed on the substrate 5, or another layer such as an adhesion layer may be interposed between the respective layers. The embodiment shown in FIG. 1 illustrates a case in which the first layer 10 is directly arranged on the substrate 5.

A thermal decomposition temperature in the first layer 10 is preferably set to 350° C. or higher. The thermal decomposition temperature in the first layer 10 set to 350° C. or higher can improve thermal resistance of the heat shield component 100. The thermal decomposition temperature can be a temperature at which a mass reduction rate is 5%, measured by thermal gravimetric (TG) analysis. The thermal gravimetric analysis may be conducted at a heating rate of 10° C./min while 100 mL/min of air is allowed to flow in a sample chamber.

A material included in the first layer 10 is preferably, but not necessarily, resin such as polyimide, polyamide, and polyamide-imide. This type of resin is preferable since the resin has a lower thermal conductivity and volumetric specific heat, and higher thermal resistance than metal or a metal oxide. The resin included in the first layer 10 is more preferably at least either polyimide or polyamide-imide, and particularly preferably polyimide. Polyimide has higher intensity and thermal resistance, and is thus preferable to be used at a part required to have high heat-insulating properties.

A method of forming the first layer 10 on the substrate 5 may be any method. For example, the first layer 10 may be laminated on the substrate 5, or the first layer 10 may be formed such that a solution in which a solvent is added to the material for forming the first layer 10 is applied to the substrate 5 and then dried and heated.

The method of laminating the first layer 10 on the substrate 5 may be any conventionally-known method using an extruder, for example. The method of applying the first layer 10 to the substrate 5 may be any conventionally-known method, such as spray coating, roll coating, doctor blading, flow coating, dip coating, spin coating, screen printing, and ink jetting.

The solvent added to the material included in the first layer 10 is determined as appropriate, and may be an amide-based solvent such as N-methyl-2-pyrrolidone (NMP), N,N-dimethylformamide (DMF), and N,N-dimethylacetamide (DMAc), or an ether-based solvent such as diethyleneglycol dimethyl ether, triethyleneglycol dimethyl ether, tetraethyleneglycol dimethyl ether, diethyleneglycol, and triethyleneglycol. One of these solvents may be used independently, or two or more solvents may be selectively used together. The content of the solvent is preferably set in a range of 40% to 90% by mass, and more preferably 60% to 85% by mass, with respect to the total amount of the solution in which the solvent is added to the material included in the first layer 10.

When the first layer 10 includes polyimide, for example, the first layer 10 may be formed such that a polyamic acid solution which is a precursor of polyimide is applied to the surface of the substrate 5, and is then dried and heated. When the first layer 10 includes polyamide-imide, for example, the first layer 10 may be formed such that a polyamide-imide solution which is a precursor of polyamide-imide is applied to the surface of the substrate 5, and is then dried and heated. The drying temperature may be set in a range of 100° C. to 150° C., and the heating temperature may be set in a range of 150° C. to 350° C., for example.

The first layer 10 includes pores 15. An average particle diameter of the pores 15 is preferably, but not necessarily, set in a range of 1 µm to 200 µm, more preferably in a range of 3 µm to 100 µm, and still more preferably in a range of 5 µm to 50 µm. The size of the pores 15 set in the above range can achieve both the intensity and the heat-insulating properties of the first layer 10. The average particle diameter of the pores 15 may be an average value of diameters of several tens of the pores 15 observed in a photograph of the first layer 10 in cross section with a scanning electron microscope (SEM), for example.

The pores 15 in the first layer 10 may be formed by any method. For example, the pores 15 may be provided such that hollow beads having an outer shell made of ceramic and encapsulating the pores 15 are added to the first layer 10. Alternatively, the pores 15 may be provided such that the solution in which the solvent is added to the material for forming the first layer 10 is applied to the substrate 5, and is then heated to volatilize the solvent under the conditions in which the pores 15 are formed.

A porosity of the first layer 10 is preferably, but not necessarily, set to 30% or greater, and more preferably 50% or greater. The porosity of the first layer 10 set to 30% or greater provides a sufficient number of pores, achieving the first layer 10 having the sufficient heat-insulating properties. The porosity of the first layer 10 is preferably, but not necessarily, set to 90% or less, and more preferably 70% or less. The porosity of the first layer 10 set to 90% or less can keep the physical strength of the first layer 10. The porosity of the first layer 10 may be measured such that the cross section is observed with an electron microscope so as to calculate a percentage of the total area of the pores 15 in the first layer 10.

A method of regulating the size and the porosity of the pores 15 in the first layer 10 may be any method. When the hollow beads described above are used to form the pores 15, for example, the size and the content of the hollow beads are changed as appropriate, so as to regulate the size and the porosity of the pores 15. When the material including the solvent described above is applied, dried, and heated to form the pores 15, for example, the type and the content of the solvent, and the drying temperature and the drying time of the solvent are changed as appropriate, so as to regulate the size and the porosity of the pores 15. For example, the porosity of the imide polymer may be regulated by the type and the content of the solvent such that a mixed ratio of the amide-based solvent and the ether-based solvent is regulated. Since the amide-based solvent relatively has high solubility in the imide polymer, and the ether-based solvent relatively has low solubility in the imide polymer, the difference in solubility between these solvents tends to cause phase separation. The porosity of the first layer 10 thus can be increased when the mixed ratio of the ether-based solvent is increased. The content of the ether-based solvent is preferably set to 30% by mass or greater and 90% by mass or lower, with respect to the total amount of the amide-based solvent and the ether-based solvent.

A thermal conductivity of the first layer 10 is 0.3 W/(m·K) or less. The thermal conductivity of the first layer 10 set to 0.3 W/(m·K) or less can improve the heat-insulating properties of the heat shield component 100, so as to improve fuel efficiency when used in an internal combustion engine, for example. The thermal conductivity of the first layer 10 is more preferably set to 0.2 W/(m·K) or less, and still more preferably 0.1 W/(m·K) or less. The lower limit of the thermal conductivity of the first layer 10 is determined as appropriate, and is set to 0.01 W/(m·K) or greater, for example. The thermal conductivity of the first layer 10 may be calculated by multiplying a density, a specific heat capacity, and a heat diffusion time.

A volumetric specific heat of the first layer 10 is 1200 kJ/(m$^3$·K) or less. Such a volumetric specific heat can improve the heat-insulating properties of the heat shield component 100, so as to improve the fuel efficiency when used in an internal combustion engine, for example. The volumetric specific heat of the first layer 10 is more preferably set to 1000 kJ/(m$^3$·K) or less, and still more preferably 700 kJ/(m$^3$·K) or less. The lower limit of the volumetric specific heat of the first layer 10 is determined as appropriate, and is set to 100 kJ/(m$^3$·K) or greater, for example. The volumetric specific heat of the first layer 10 may be calculated by multiplying the density and the specific heat capacity.

The density of the first layer 10 is preferably, but not necessarily, set in a range of 500 kg·m$^3$ or greater and 1300 kg·m$^3$ or less. The density of the first layer 10 set to 500 kg·m$^3$ or greater leads to an improvement in strength of the first layer 10. The density of the first layer 10 set to 1300 kg·m$^3$ or less leads to an improvement in the heat-insulating properties. The density of the first layer 10 is more preferably set to 600 kg·m$^3$ or greater and 990 kg·m$^3$ or less. The density of the first layer 10 can be a bulk density.

More preferably, the thermal conductivity of the first layer 10 is set to 0.2 W/(m·K) or less, and the volumetric specific heat of the first layer 10 is set to 1000 kJ/(m$^3$·K) or less. Particularly preferably, the thermal conductivity of the first layer 10 is set to 0.1 W/(m·K) or less, and the volumetric specific heat of the first layer 10 is set to 1000 kJ/(m$^3$·K) or less. The first layer 10 having the thermal conductivity and the volumetric specific heat set as described above can further improve the heat-insulating properties of the heat shield component 100, so as to improve the fuel efficiency when used in an internal combustion engine, for example.

The specific heat capacity of the first layer 10 is determined as appropriate, and may be set to 0.1 kJ/(kg·K) or greater and 3 kJ/(kg·K) or less. Alternatively, the specific heat capacity of the first layer 10 may be set to 0.95 kJ/(kg·K) or greater and 2 kJ/(kg·K) or less. The specific heat capacity of the first layer 10 may be measured by differential scanning calorimetry (DSC).

A thickness of the first layer 10 is preferably set to 10 μm or greater and 250 μm or less. The thickness of the first layer 10 set to 10 μm or greater can improve the heat-insulating properties of the first layer 10, so as to improve the fuel efficiency when used in an internal combustion engine, for example. The thickness of the first layer 10 set to 250 μm or less can prevent combustion gas in a cylinder from being excessively heated so as to avoid knocking, when the heat shield component 100 is used in an internal combustion engine, for example.

<Second Layer 20>

The second layer 20 is arranged on the first layer 10 to provide closed pores 25 between the first layer 10 and the second layer 20. The second layer 20 may be directly formed on the first layer 10, or another layer such as an adhesion layer may be interposed between the respective layers. The embodiment shown in FIG. 1 illustrates a case in which the second layer 20 is directly arranged on the first layer 10. This arrangement can cover the uneven surface caused by the pores in the first layer 10 with the second layer 20, so as to reduce the surface area of the top surface 7a of the heat shield film 7 to lead the surface roughness to a predetermined value or smaller. The closed pores 25 provided between the first layer 10 and the second layer 20 can block heat transmitted toward the substrate 5. This can improve the heat-insulating properties and the effect of reducing the emission amount of hydrocarbon in the heat shield component 100.

A porosity of the second layer 20 is preferably, but not necessarily, set to 20% or less, in order to decrease the surface area of the top surface 7a of the heat shield film 7. The porosity of the second layer 20 set to 20% or less can reduce the surface roughness, so as to improve the heat-insulating properties and the effect of reducing the emission amount of hydrocarbon in the heat shield component 100. The porosity of the second layer 20 is more preferably set to 10% or less, and still more preferably 5% or less. The porosity of the second layer 20 may be measured such that the cross section is observed with an electron microscope so as to calculate a percentage of the total area of the pores in the second layer 20.

A thermal decomposition temperature in the second layer 20 is preferably 350° C. or higher. The thermal decomposition temperature in the second layer 20 set to 350° C. or higher can improve the thermal resistance of the heat shield component 100. The thermal decomposition temperature can be a temperature at which a mass loss rate is 5%, measured by thermal gravimetric (TG) analysis. The thermal gravimetric analysis may be conducted at a heating rate of 10° C./min while 100 mL/min of air is allowed to flow in a sample chamber. The thermal decomposition temperature is preferably 350° C. or higher in both the first layer 10 and the second layer 20.

A material included in the second layer 20 is preferably, but not necessarily, resin such as polyimide, polyamide, and polyamide-imide. This type of resin is preferable since the resin has a lower thermal conductivity and volumetric specific heat, and higher thermal resistance than metal or a metal oxide. The resin included in the second layer 20 is more preferably at least either polyimide or polyamide-imide, and particularly preferably polyimide. Polyimide has higher intensity and thermal resistance, and is thus preferable to be used at a part required to have high heat-insulating properties. Both the first layer 10 and the second layer 20 are preferably formed of a material including polyimide.

A method of forming the second layer 20 on the first layer 10 may be any method. For example, the second layer 20 may be laminated on the first layer 10, or the second layer 20 may be formed such that a solution in which a solvent is added to the material formed for the second layer 20 is applied to the first layer 10 and then dried and heated.

The method of laminating the second layer 20 on the first layer 10 may be any conventionally-known method using an extruder, for example. The method of applying the second layer 20 to the first layer 10 may be any conventionally-known method, such as spray coating, roll coating, doctor blading, flow coating, dip coating, spin coating, screen printing, and ink jetting.

The solvent added to the material formed for the second layer 20 is determined as appropriate, and may be an amide-based solvent such as N-methyl-2-pyrrolidone (NMP), N,N-dimethylformamide (DMF), and N,N-dimethylacetamide (DMAc). One of these solvents may be used independently, or two or more solvents may be selectively used together. The content of the solvent is preferably set in a range of 40% to 90% by mass, and more preferably 60% to 85% by mass, with respect to the total amount of the solution in which the solvent is added to the material formed for the second layer 20.

When the second layer 20 includes polyimide, for example, the second layer 20 may be formed such that a polyamic acid solution which is a precursor of polyimide is applied to the surface of the first layer 10 and is then dried and heated. When the second layer 20 includes polyamide-imide, for example, the second layer 20 may be formed such that a polyamide-imide solution which is a precursor of polyamide-imide is applied to the surface of the first layer 10 and is then dried and heated. The drying temperature may be set in a range of 100° C. to 150° C., and the heating temperature may be set in a range of 150° C. to 350° C., for example.

A thickness of the second layer 20 is preferably set to 1 μm or greater and 10 μm or less. The thickness of the second layer 20 set to 1 μm or greater can effectively provide the closed pores 25 to improve the heat-insulating properties. The thickness of the second layer 20 set to 10 μm or less enables the second layer 20 to have a uniform thickness.

<Third Layer 30>

Figure 2:
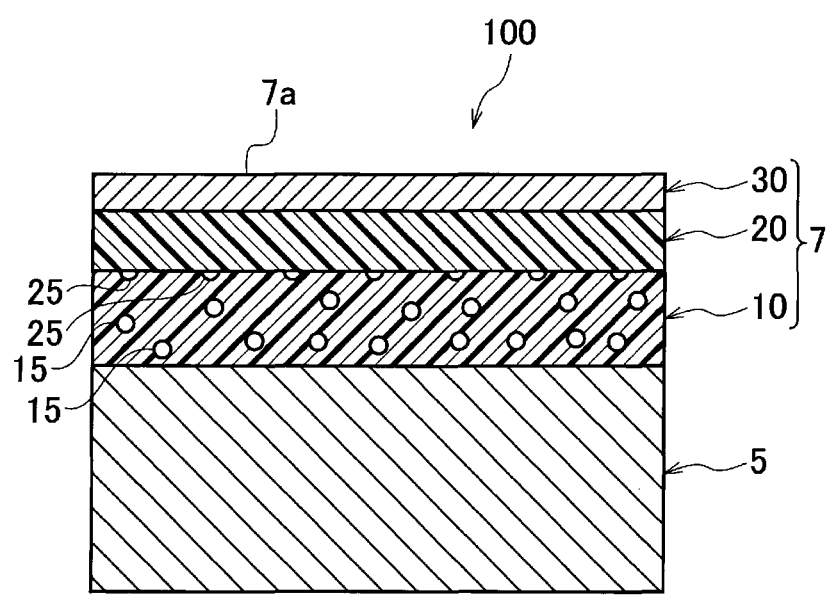
FIG. 2 is a cross-sectional view illustrating another example of the heat shield component according to the present embodiment.

The heat shield film 7 preferably further includes a third layer 30 arranged on the second layer 20 and having a thermal decomposition temperature of 500° C. or higher. The third layer 30 may be directly formed on the second layer 20, or another layer such as an adhesion layer may be interposed between the respective layers. The embodiment shown in FIG. 2 illustrates a case in which the third layer 30 is directly arranged on the second layer 20.

The thermal decomposition temperature of the third layer 30 set to 500° C. or higher can improve the thermal resistance of the heat shield component 100. The thermal decomposition temperature can be a temperature at which a mass loss rate is 5%, measured by thermal gravimetric (TG) analysis. The thermal gravimetric analysis may be conducted at a heating rate of 10° C./min while 100 mL/min of air is allowed to flow in a sample chamber.

The third layer 30 is preferably formed of an inorganic film mainly including silica. The inorganic film mainly including silica has high thermal resistance and enables the surface to be smooth. The inorganic film mainly including silica when used as the third layer 30 can further improve the heat-insulating properties and the effect of reducing the emission amount of hydrocarbon in the heat shield component 100. The inorganic film mainly including silica may be obtained such that a solution including polysilazane, for example, is applied to the surface of the second layer 20 and then cured. The inorganic film mainly including silica according to the present embodiment refers to an inorganic film including 50% by mass or greater of silica. The third layer 30 is preferably formed of an inorganic film including 90% by mass or greater of silica.

The third layer 30 is also preferably an amorphous carbon-based thin film. The amorphous carbon-based thin film refers to a thin film including 50% by mass or greater of amorphous carbon. The third layer 30 is preferably formed of an inorganic film including 90% by mass or greater of amorphous carbon. The amorphous carbon-based thin film is black-colored, and has high heat-insulating properties. The amorphous carbon-based thin film when used as the third layer 30 can further improve the heat-insulating properties of the heat shield component 100. The amorphous carbon-based thin film may be diamond-like carbon, for example.

The amorphous carbon-based thin film may be formed by any method, such as a chemical vapor deposition (CVD) method and a physical vapor deposition (PVD) method. Examples of CVD methods include a thermal CVD method and a plasma CVD method. Examples of PVD methods include vacuum deposition and sputtering.

A thickness of the third layer 30 is preferably, but not necessarily, set to 0.01 µm or greater and 5 µm or less. The thickness of the third layer 30 set to 0.01 µm or greater can improve the heat-insulating properties of the heat shield component 100, for example. The thickness of the third layer 30 set to 5 µm or less can prevent cracks caused in the third layer 30. The thickness of the third layer 30 is more preferably set to 0.05 µm or greater and 1 µm or less.

The surface roughness on the top surface 7a of the heat shield film 7 is 1.5 µm Ra or less. The surface roughness on the top surface 7a of the heat shield film 7 set to 1.5 µm Ra or less can improve the heat-insulating properties of the heat shield component 100 and reduce the emission amount of hydrocarbon.

If a porous metal oxide layer is formed by thermal spraying, the surface area on the top surface of the heat shield film tends to increase, and heat exchange between the surface of the heat shield film and an air layer increases, which impedes sufficient heat-insulating properties of the heat shield component. If the surface area of the top surface of the heat shield film is large, fuel gas such as gasoline easily adheres to the wall surface, causing an increase in the emission amount of hydrocarbon. The present embodiment thus sets the surface roughness on the top surface 7a of the heat shield film 7 to a predetermined value or smaller, so as to reduce heat exchange between the uppermost surface of the heat shield component 100 and the air layer and avoid adhesion of fuel gas to the wall surface of the heat shield component 100. This can improve the heat-insulating properties of the heat shield component 100 and reduce the emission amount of hydrocarbon accordingly.

The surface roughness on the top surface 7a of the heat shield film 7 is preferably set to 0.5 µm Ra or less, and more preferably 0.1 µm Ra or less. The lower limit of the surface roughness on the top surface 7a of the heat shield film 7 is determined as appropriate, and is 0.01 µm Ra or greater, for example. The surface roughness is the arithmetical mean roughness and may be measured with a stylus surface roughness measuring instrument according to JIS B0601: 2013 (Geometrical Product Specifications (GPS)—Surface texture: Profile method—Terms, definitions, and surface texture parameters).

The top surface 7a of the heat shield film 7 is a surface not toward the substrate 5 but toward the second layer 20 about the first layer 10. The measurement of the surface roughness is performed on the surface of the second layer 20 opposite to the first layer 10 when the heat shield component 100 includes the substrate 5, the first layer 10, and the second layer 20. The measurement of the surface roughness is performed on the surface of the third layer 30 opposite to the second layer 20 when the heat shield component 100 includes the substrate 5, the first layer 10, the second layer 20, and the third layer 30.

According to the present embodiment, a gas adsorption area per unit projected area on the top surface 7a of the heat shield film 7 is preferably set to 20 m$^2$/m$^2$ or smaller. The gas adsorption area per unit projected area set to 20 m$^2$/m$^2$ or smaller can improve the heat-insulating properties of the heat shield component 100 and reduce the emission amount of hydrocarbon, as in the case of reducing the surface roughness. The gas adsorption area per unit projected area on the top surface 7a of the heat shield film 7 is more preferably set to 3 m$^2$/m$^2$ or smaller, still more preferably 1.5 m$^2$/m$^2$ or smaller, and particularly preferably 1.1 m$^2$/m$^2$ or smaller. The gas adsorption area per unit projected area on the top surface 7a of the heat shield film 7 may be calculated by dividing a gas adsorption area on the top surface 7a of the heat shield film 7 measured by a BET method by a projected area on the outermost layer.

The thickness of the first layer 10 is preferably set in the range of $6.7119e^{(0.0063 \times thermal\ conductivity \times volumetric\ specific\ heat)}$ µm to $67.119e^{(0.0063 \times thermal\ conductivity \times volumetric\ specific\ heat)}$ µm. The thickness of the first layer set to $6.7119e^{(0.0063 \times thermal\ conductivity \times volumetric\ specific\ heat)}$ µm or greater can improve the heat-insulating properties of the heat shield component 100. The thickness of the first layer set to $67.119e^{(0.0063 \times thermal\ conductivity \times volumetric\ specific\ heat)}$ µm or less can prevent combustion gas in a cylinder from being excessively heated so as to avoid knocking, when the heat shield component is used in an internal combustion engine, for example.

Figure 3:
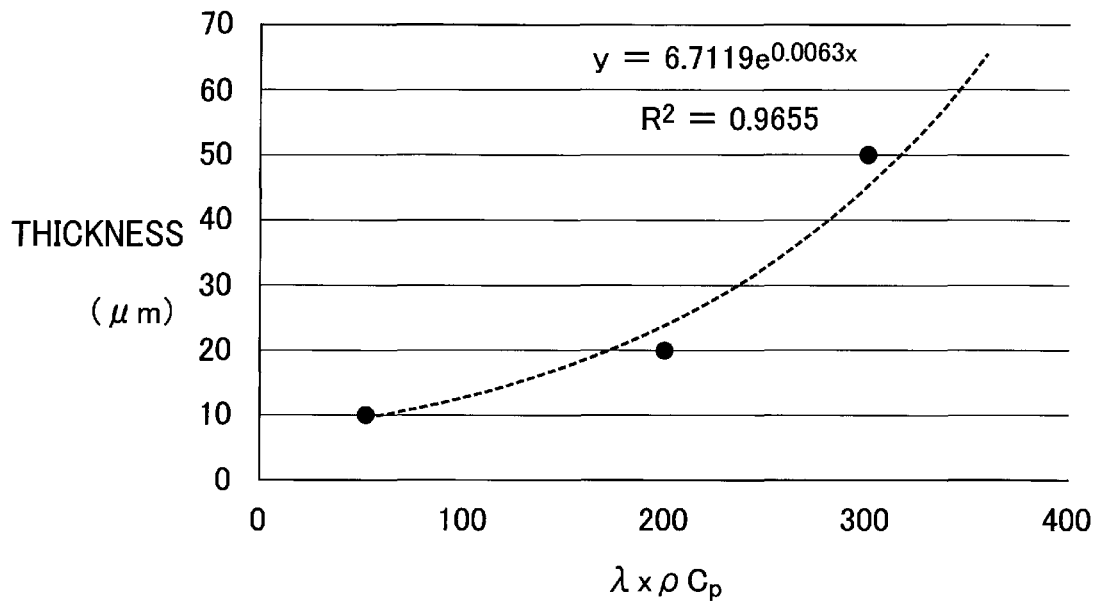
FIG. 3 is a graph showing a preferable smallest film thickness in each material obtained by approximation.

With regard to the thickness of $6.7119e^{(0.0063 \times thermal\ conductivity \times volumetric\ specific\ heat)}$ µm internal combustion engines in which the respective substrates are covered with different materials are evaluated, so as to observe a minimum thickness of the first layer 10 contributing to a predetermined level or higher of fuel consumption than a case of being covered with an anodized aluminum layer. The observation results are plotted, on the graph shown in FIG. 3, to the respective coordinates in which the X axis represents $\lambda \times \rho \times C_p$ and the Y axis represents the thickness of the first layer 10, so as to determine a relation with an appropriate minimum thickness by exponential approximation. In the graph shown in FIG. 3, $\lambda$ is the thermal conductivity (W/(m·K)) of the first layer 10, $\rho$ is the density (kg/m$^3$) of the first layer 10, and $C_p$ is the specific heat capacity (kJ/(kg·K)) of the first layer 10.

Figure 4:
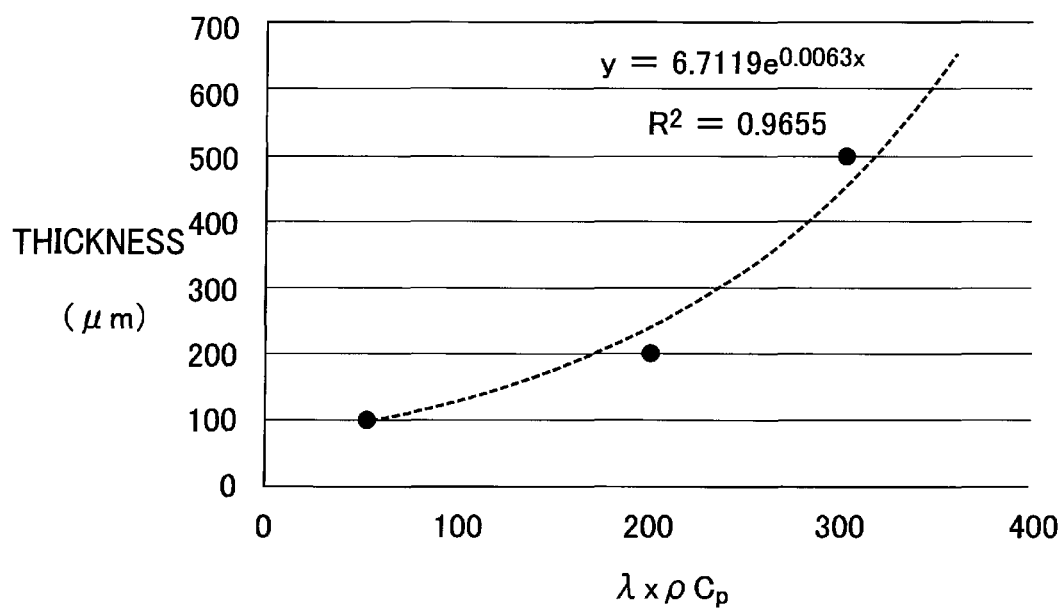
FIG. 4 is a graph showing a preferable greatest film thickness in each material obtained by approximation.

Similarly, with regard to the thickness of $k67.119e^{(0.0063 \times thermal\ conductivity \times volumetric\ specific\ heat)}$ µm, the internal combustion engines in which the respective substrates are covered with different materials are evaluated, so as to observe a maximum thickness of the first layer 10 capable of avoiding knocking. The observation results are plotted, on the graph shown in FIG. 4, to the respective coordinates in which the X axis represents $\lambda \times \rho \times C_p$ and the Y axis represents the thickness of the first layer 10, so as to determine a relation with an appropriate maximum thickness by exponential approximation. In the graph shown in FIG. 4, $\lambda$ is the thermal conductivity (W/(m·K)) of the first layer 10, $\rho$ is the density (kg/m³) of the first layer 10, and $C_p$ is the specific heat capacity (kJ/(kg·K) of the first layer 10.

As described above, the heat shield component according to the present embodiment includes the substrate, and the heat shield film arranged on the substrate. The heat shield film includes the first layer arranged on the substrate, including the pores, and having the thermal conductivity of 0.3 W/(m·K) or lower and the volumetric specific heat of 1200 kJ/(m³·K) or lower, and the second layer arranged on the first layer to provide the closed pores between the first layer and the second layer. The surface roughness on the top surface of the heat shield film is 1.5 μm Ra or lower.

According to the present embodiment, the thermal conductivity and the volumetric specific heat of the first layer are each set to a predetermined value or smaller. This configuration can improve the heat-insulating properties as compared with a case of providing an anodized aluminum layer on the surface of the substrate. The heat shield component when used in an internal combustion engine can improve the fuel efficiency of the internal combustion engine as compared with the case of providing the anodized aluminum layer. If the surface of the substrate is provided with a metal oxide, as described in the conventional case, the layer is presumed to fail to have a predetermined value or lower of the thermal conductivity or the volumetric specific heat, impeding the improvement in fuel efficiency more than the case of providing the anodized aluminum layer.

According to the present embodiment, the second layer is arranged on the first layer including the pores. The closed pores, which are provided between the first layer and the second layer, can function as a heat-insulating material, so as to improve the heat-insulating properties of the heat shield component.

In addition, since the second layer covers the pores in the first layer, and the surface roughness on the top surface of the heat shield film is set to a predetermined value or lower, the surface area on the top surface of the heat shield film is decreased, so as to prevent heat exchange between the surface of the heat shield component and the air layer. Further, the reduction in the surface area on the top surface of the heat shield film can avoid adhesion of fuel gas to the wall surface of the heat shield component.

The heat shield component according to the present embodiment can improve the heat-insulating properties and the effect of reducing the emission amount of hydrocarbon.

[Internal Combustion Engine]

An internal combustion engine according to the present embodiment is described below. The internal combustion engine according to the present embodiment includes the heat shield component. The heat shield component has high heat-insulating properties and high efficiency of reducing the emission amount of hydrocarbon as described above, and thus can contribute to improving the fuel efficiency and reducing the emission amount of hydrocarbon when used in the internal combustion engine. The heat shield component is preferably arranged on a surface of a member subjected to combustion gas to result in high temperature. Examples of members subjected to combustion gas to result in high temperature include a component included in a combustion chamber, such as a piston, a cylinder head, a valve, and a cylinder, and a component in an exhaust system, such as a cylinder head-exhaust port, an exhaust manifold, an exhaust pipe, and a turbocharger. The heat shield component is not necessarily provided on the entire surface of each of these components, and may be applied to part of a surface subjected to combustion gas to result in high temperature.

EXAMPLES

Hereinafter, the present embodiment is described in more detail below with reference to Examples and Comparative Examples, but is not intended to be limited to the following examples.

Example 1

First, a substrate made of aluminum and having a thickness of 9.5 mm was impregnated in hot water at 100° C. for 10 minutes to be cleaned so as to improve adhesion. A density $\rho_1$ of the substrate was 2700 kg/m³, a thermal conductivity $\lambda_1$ of the substrate was 236 W/(m·K), a specific heat capacity $C_{1P}$ was 910 J/(kg·K), and a volumetric specific heat was 2457 (J/(m³·K)).

Subsequently, a polyamic acid solution (a precursor of polyimide) diluted with dimethylacetamide (DMAc) and tetraethyleneglycol dimethyl ether (TEGM) so as to have a solids concentration of 26% by mass, was prepared. The content of TEGM was set to 50% by mass of the total amount of DMAc and TEGM. The polyamic acid solution was then applied to the surface of the substrate cleaned as described above by a spin coater such that the thickness resulted in 90 μm after the solvent was volatilized.

The substrate to which the polyamic acid solution was applied was dried at 130° C. for 30 minutes and then heated at 200° C. for 60 minutes, so as to form a first layer including polyimide on the aluminum substrate.

Thereafter, a polyamic acid solution (a precursor of polyimide) diluted with dimethylacetamide (DMAc) so as to have a solids concentration of 26% by mass, was prepared. The polyamic acid solution (the precursor of polyimide) was then applied to the surface of the first layer by the spin coater such that the thickness after the volatilization of the organic solvent resulted in 10 μm.

The applied polyamic acid solution was dried at 130° C. for 30 minutes and then heated at 200° C. for 60 minutes to form a second layer including polyimide on the first layer, so as to obtain a heat shield component.

Example 2

A heat shield component of this example was obtained in the same manner as Example 1, except that a polysilazane solution was applied to the surface of the second layer and then cured so as to form a third layer including silica with a thickness of 0.38 μm.

Example 3

A heat shield component of this example was obtained in the same manner as Example 1, except that a third layer formed of an amorphous carbon-based thin film (diamond-like carbon) with a thickness of 0.1 μm was formed on the surface of the second layer by sputtering.

Example 4

A heat shield component of this example was obtained in the same manner as Example 1, except that the thickness of the first layer was changed from 90 μm to 190 μm, and a polysilazane solution was applied to the surface of the second layer and then cured so as to form a third layer including silica with a thickness of 0.38 μm.

Example 5

A heat shield component of this example was obtained in the same manner as Example 1, except that the content of TEGM in the polyamic acid solution used for the first layer was set to 30% by mass of the total amount of DMAc and TEGM.

Example 6

A polyamide-imide solution (a precursor of polyamide-imide) diluted with N-methyl-2-pyrrolidone (NMP) and tetraethyleneglycol dimethyl ether (TEGM) so as to have a solids concentration of 30% by mass, was prepared. The content of TEGM was set to 40% by mass of the total amount of NMP and TEGM. The polyamide-imide solution was then applied to the surface of the cleaned substrate by a spin coater such that the thickness after the volatilization of the organic solvent resulted in 190 μm.

The substrate to which the polyamide-imide solution was applied was dried at 130° C. for 30 minutes and then heated at 200° C. for 60 minutes, so as to form a first layer including polyamide-imide on the aluminum substrate.

Thereafter, a polyamide-imide solution (a precursor of polyamide-imide) diluted with N-methyl-2-pyrrolidone (NMP) so as to have a solids concentration of 30% by mass, was prepared. The polyamide-imide solution was then applied to the surface of the first layer by the spin coater such that the thickness after the volatilization of the organic solvent resulted in 10 μm.

The applied polyamide-imide solution was dried at 130° C. for 30 minutes and then heated at 200° C. for 60 minutes to form a second layer including polyamide-imide on the first layer, so as to obtain a heat shield component.

The heat shield component of this example was manufactured in the same manner as Example 1 except for the above steps.

Comparative Example 1

The aluminum substrate having a casted surface without the first layer stacked thereon was used. A density $\rho_1$ of the aluminum substrate was 2740 kg/m$^3$, a thermal conductivity $\lambda_1$ of the substrate was 126 W/(m·K) a specific heat capacity $C_{1P}$ was 869 J/(kg·K), and a volumetric specific heat was 2381 kJ/(m$^3$·K).

Comparative Example 2

The aluminum substrate without the first layer stacked thereon was used in the same manner as Comparative Example 1, except that the aluminum substrate was different from that used in Comparative Example 1. A density $\rho_1$ of the substrate was 2700 kg/m$^3$, a thermal conductivity $\lambda_1$ of the substrate was 236 W/(m·K), a specific heat capacity $C_{1P}$ was 910 J/(kg·K), and a volumetric specific heat was 2457 kJ/(m$^3$·K). Namely, the aluminum substrate used in Comparative Example 2 is the same as used in Example 1.

Comparative Example 3

The surface of the substrate was anodized so as to form an anodized aluminum layer with a thickness of 70.0 μm, instead of the first layer. A stacked body including the substrate and the anodized aluminum layer was prepared in the same manner as Example 1 except for the above step.

Subsequently, a solution of polysilazane was applied to the surface of the anodized aluminum layer of the stacked body and was then cured to form a third layer including silica with a thickness of 0.54 μm, so as to obtain a heat shield component of this example.

Comparative Example 4

Partially-stabilized zirconia particles ($ZrO_2$-$8Y_2O_3$, volume mean diameter: 50 μm to 60 μm) were thermal-sprayed to the surface of the substrate so as to form a zirconia thermal-sprayed layer with a thickness of 500.0 μm, instead of the first layer. A heat shield component of this example was obtained in the same manner as Example 1 except for the above step.

Comparative Example 5

A polyamic acid solution (a precursor of polyimide) diluted with dimethylacetamide (DMAc) so as to have a solids concentration of 26% by mass, was prepared. The polyamic acid solution (the precursor of polyimide) was then applied to a surface of a substrate by a spin coater such that the thickness after the volatilization of the organic solvent resulted in 50 μm. The applied polyamic acid solution was dried at 130° C. for 30 minutes and then heated at 200° C. for 60 minutes to form a first layer including polyimide on the substrate, so as to obtain a heat shield component. A second layer was not formed on the first layer. The heat shield component of this example was manufactured in the same manner as Example 1 except for the above steps.

Comparative Example 6

A heat shield component of this example was obtained in the same manner as Example 1, except that the thickness of the first layer was changed from 90 μm to 100 μm, and a second layer was not formed on the first layer.

[Evaluation]

The heat shield components obtained in Examples and Comparative Examples were evaluated as follows. Table 1 and Table 2 list the evaluation results.

<Porosity p>

The porosity p (%) of the first layer was calculated such that a micrograph of the heat shield component in cross section imaged by a scanning electron microscope (SEM) was analyzed. In particular, first, the cross section of the first layer was imaged with the SEM. Subsequently, the scanning electron micrograph was converted into a grayscale image with a compact multi-purpose image analyzer LUZEX (registered trademark) AP (available from NIRECO CORPORATION). Using a binary image in which a threshold was designated between pores and other parts, a percentage of the areas of the pores with respect to the total area of the first layer was calculated as a porosity.

<Thermal Conductivity $\lambda_1$ of Substrate>

The thermal conductivity $\lambda_1$ (W/(m·K)) of the substrate was calculated according to the formula $\lambda_1 = \rho_1 C_{1P} \alpha_1$, where $\rho_1$ is the density (kg/m$^3$) of the substrate, $C_{1P}$ is the specific heat capacity (J/(kg·K)) of the substrate, and $\alpha_1$ is the thermal diffusivity (m$^2$/s) of the substrate. The methods of measuring the density $\rho_1$ of the substrate, the specific heat capacity $C_{1P}$ of the substrate, and the thermal diffusivity $\alpha_1$ of the substrate are as follows:

<Density $\rho_1$ of Substrate>

The substrate was cut into a disk with a diameter of 10 mm and a thickness of 1 mm, and the weight of the disk was measured at a room temperature (20° C.) in air, so as to measure the density $\rho_1$ (kg/m³) of the substrate.

<Specific Heat Capacity $C_{1P}$ of Substrate>

The substrate was cut into a disk with a diameter of 10 mm and a thickness of 1 mm, so as to measure the specific heat capacity $C_{1P}$ (J/(kg·K)) of the substrate by a laser flash method at a room temperature (20° C.) in air. The specific heat capacity of the substrate was measured with a thermal constant measuring apparatus (TC-7000, available from ULVAC-RIKO, Inc.).

<Thermal Diffusivity $\alpha_1$ of Substrate>

The substrate was cut into a disk with a diameter of 10 mm and a thickness of 1 mm, so as to measure the thermal diffusivity $\alpha_1$ (m²/s) of the substrate by a laser flash method at a room temperature (20° C.) in air. The thermal diffusivity $\alpha_1$ of the substrate was measured with a thermal constant measuring apparatus (TC-7000, available from ULVAC-RIKO, Inc.).

<Thermal Diffusivity $\alpha_2$ of First Layer>

A thermal diffusivity $\alpha_2$ of the first layer was measured as follows: First, the surface on the substrate side of the heat shield component obtained in each of Examples and Comparative Examples was ground into a thickness of 1 mm to prepare a two-layer stacked plate. The stacked plate was cut into a disk with a diameter of 10 mm to be used as a test piece, so as to calculate an areal heat diffusion time A of the stacked plate according to a standard temperature-time curve by a laser flash method at a room temperature (20° C.) in air. The areal heat diffusion time was measured by the laser flash method with a thermal constant measuring apparatus (TC-7000, available from ULVAC-RIKO, Inc.). The areal heat diffusion time A can be given by the following mathematical formula (1):

[Math. 1]

$$A = \frac{\tau_1 d_1 \rho_1 C_{1P} + 3\tau_1 d_2 \rho_2 C_{2P} + 3\tau_2 d_1 \rho_1 C_{1P} + \tau_2 d_2 \rho_2 C_{2P}}{6 d_1 \rho_1 C_{1P} + 6 d_2 \rho_2 C_{2P}} \quad (1)$$

The above mathematical formula (1) leads to the following mathematical formula (2) when $X_1 = d_1 \rho_1 C_{1P}$, and $X_2 = d_2 \rho_2 C_{2P}$, where $d_1$ is the thickness (m) of the substrate, $\rho_1$ is the density (kg/m³) of the substrate, $C_{1P}$ is the specific heat capacity (J/(kg·K)) of the substrate, $d_2$ is the thickness (m) of the first layer, $\rho_2$ is the density (kg/m³) of the first layer, and $C_{2P}$ is the specific heat capacity (J/(kg·K)) of the first layer. The methods of measuring the density $\rho_1$ of the substrate and the specific heat capacity $C_{1P}$ of the substrate are the same as described above. The method of measuring the density $\rho_2$ of the first layer and the specific heat capacity $C_{2P}$ of the first layer are described below.

[Math. 2]

$$A = \frac{\tau_1}{6} \frac{X_1 + 3X_2}{X_1 + X_2} + \frac{\tau_2}{6} \frac{3X_1 + X_2}{X_1 + X_2} \quad (2)$$

The above mathematical formula (2) can lead to the following mathematical formula (3), so as to calculate the heat diffusion time $\tau_2$ of the first layer.

[Math. 3]

$$\frac{\tau_2}{6} = \frac{X_1 + X_2}{3X_1 + X_2} A - \frac{X_1 + 3X_2}{3X_1 + X_2} \frac{\tau_1}{6} \quad (3)$$

The heat diffusion time $\tau_2$ of the first layer calculated according to the mathematical formula (3) is substituted in the following mathematical formula (4), so as to calculate the thermal diffusivity $\alpha_2$ of the first layer.

[Math. 4]

$$\alpha_2 = \frac{d_2^2}{\tau_2} \quad (4)$$

<Density $\rho_2$ of First Layer>

The density $\rho_2$ (kg/m³) of the first layer was measured as follows: First, the first layer with a thickness of about 1 mm was formed on the substrate to obtain the stacked body. The stacked body was then cut into a test piece of 13 mm×5 mm to measure its weight, so as to calculate the density of the stacked body. The density of the substrate obtained as described above was subtracted from the density of the stacked body, so as to calculate the density of the first layer. The thickness of the first layer was calculated by subtracting the thickness of the substrate from the thickness of the stacked body. The thicknesses of the stacked body and the substrate were measured with a scanning electron microscope (SEM). The measurement with the SEM uses an average value of thicknesses measured at five points at high magnification and three points at low magnification.

<Specific Heat Capacity $C_{2P}$ of First Layer>

The specific heat capacity $C_{2P}$ (*kg·K) of the first layer was measured as follows: First, a sheet of Teflon (registered trademark) tape was attached to the first layer side of the heat shield component obtained in each example, and was then impregnated with hydrochloric acid so as to completely dissolve the substrate. The rest of the first layer was impregnated with acetone to remove the Teflon (registered trademark) tape from the first layer, so as to obtain a sample of the first layer in a powder state. Subsequently, 12 mg of the sample was measured by differential scanning calorimetry (DSC) so as to calculate the specific heat capacity of the first layer. The measurement by the DSC was performed under the conditions of an argon gas atmosphere and a measurement temperature of 20° C. The specific heat capacity was measured by the DSC with a differential scanning calorimeter (DSC-7, available from PerkinElmer, Inc.).

<Thermal Conductivity $\lambda_2$ of First Layer>

A thermal conductivity $\lambda_2$ (W/(m·K)) of the first layer was calculated according to the formula $\lambda_2 = \rho_2 C_{2P} \alpha_2$, where $\rho_2$ is the density of the first layer, $C_{2P}$ is the specific heat capacity of the first layer, and $\alpha_2$ is the thermal diffusivity of the first layer. The methods of measuring the density $\rho_2$ of the first layer, the specific heat capacity $C_{2P}$ of the first layer, and the thermal diffusivity $\alpha_2$ of the first layer are as described above.

<Volumetric Specific Heat $C_{2V}$ of First Layer>

A volumetric specific heat $C_{2V}$ (J/(m³·K)) of the first layer was calculated according to the formula $C_{2V} = C_{2P} \rho_2$, where $C_{2P}$ is the specific heat capacity (J/(kg·K)) of the first layer, and $\rho_2$ is the density (kg/m³) of the first layer. The methods of measuring the specific heat capacity $C_{2P}$ of the first layer and the density $\rho_2$ of the first layer are as described above.

<Thermal Conductivity $\lambda_3$ of Third Layer>

A thermal conductivity $\lambda_3$ (W/(m·K)) of the third layer was calculated according to the formula $\lambda_3=\rho_3 C_{3P}\alpha_3$, where $\rho_3$ is a density of the third layer, $C_{3P}$ is a specific heat capacity of the third layer, and $\alpha_3$ is a thermal diffusivity of the third layer. The methods of measuring the density $\rho_3$ of the third layer, the specific heat capacity $C_{3P}$ of the third layer, and the thermal diffusivity $\alpha_3$ of the third layer are the same as those for the first layer.

<Surface Roughness>

A surface roughness was measured as an arithmetical mean roughness on the surface of the obtained test sample, with a stylus surface roughness measuring instrument according to JIS B0601:2013.

<Gas Adsorption Area Per Unit Projected Area>

A gas adsorption area per unit projected area (m²/m²) was calculated by dividing a gas adsorption area on the top surface of the heat shield film in each example measured by a BET method by a projected area on the outermost layer.

The gas adsorption area on the top surface of the heat shield film in each example was calculated by subtracting a gas adsorption area of a layer under the top surface of the heat shield film from the total gas adsorption area of the heat shield component in each example measured by a BET method. The gas adsorption area of the layer under the top surface of the heat shield film is calculated while the gas adsorption area of the substrate itself and the exposed surface area (the projected area of the surface layer) are taken into account, for example.

The gas adsorption area was measured according to JIS Z8830:2013 (ISO 9277:2010). In particular, the gas adsorption area was measured under the following conditions:

Measuring equipment: Fully automatic gas sorption analyzer Autosorb (registered trademark) iQ (available from Quantachrome Instruments)

Sample: Heat shield component in each example cut into a strip with a width of 5 mm and a length of 25 mm Sample cell: Thin film cell with a stem diameter of 9 mm Degassing (sample pretreatment): Heating in a vacuum (1 Pa or lower) at 100° C. for one hour or longer Adsorptive gas: Krypton (Kr) gas Measuring temperature: 77.35 K (under liquid nitrogen)

Measuring method: Static volumetry

Analysis item: Specific surface area by multi-point BET

Relative pressure of measured adsorptive gas: 13 points between 0.075 and 0.3

Number of measurement: Twice per sample

<Thermal Decomposition Temperature>

A thermal decomposition temperature was evaluated as a temperature at which a mass loss rate was 5%, measured by thermal gravimetric (TG) analysis, under heating temperature from 20° C. to 950° C. at 10° C./min while 100 mL/min of air was allowed to flow in a sample chamber. The amount of the sample was 5 mg, and a case was a platinum pan.

<Cooling Response Test>

Figure 5:
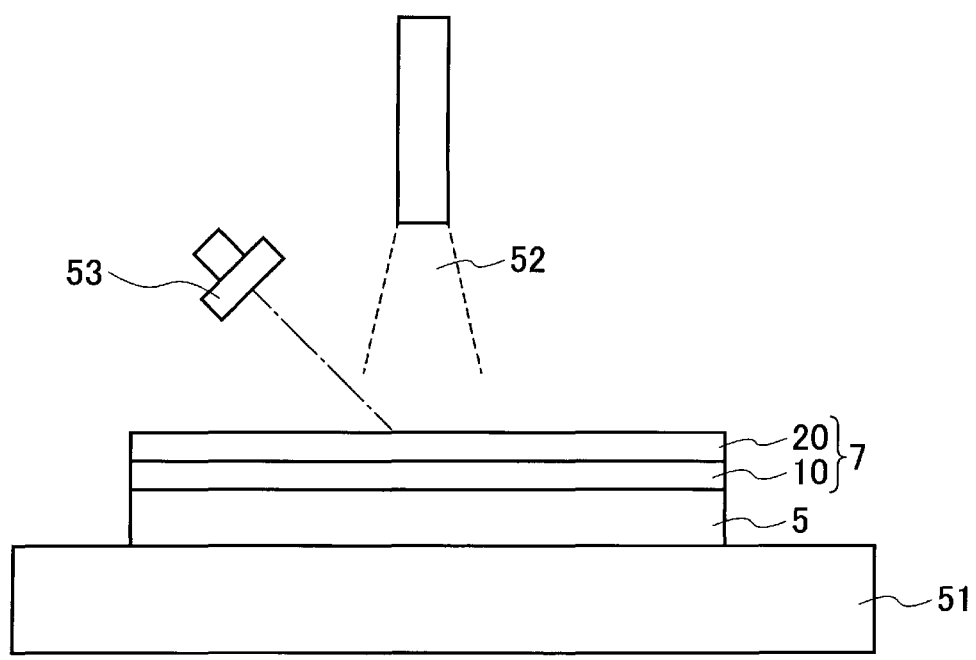
FIG. 5 is a schematic view showing a measurement method for a cooling response test.

As shown in FIG. 5, the heat shield component of each example was cut into a test piece with a size of 50 mm in length, 50 mm in width, and 9.5 mm in thickness, and the test piece on the substrate 5 side was put on a heater 51. The test piece on the substrate 5 side was heated by the heater 51 to increase the temperature on the uppermost surface of the heat shield component to 250° C., and a blow of air 52 at 20° C. was then applied at a flow rate of 0.002 m³/sec to the uppermost surface of the heat shield component so as to measure the temperature on the uppermost surface of the heat shield component. The temperature on the uppermost surface of the heat shield component was measured with a temperature distribution image acquired by an infrared camera 53. Table 2 lists the results indicating a decrease in temperature on the uppermost surface of the heat shield component measured ten seconds after the blow of air 52 was applied. While FIG. 5 illustrates the case of Example 1 in which the second layer 20 is the uppermost layer, the cooling response test can be performed on the third layer 30, instead of the second layer 20, when the third layer 30 is the uppermost layer.

<Concentration of Hydrocarbon>

A concentration of hydrocarbon (HC) was evaluated such that the heat shield component manufactured as described above was arranged on the top surface of a cylinder head to manufacture an internal combustion engine so as to measure the concentration in emission gas. The evaluation results indicate the decreased amount of the concentration on the basis of Comparative Example 1, and show a positive value when the concentration of hydrocarbon is decreased more than that in Comparative Example 1. As the value is larger, the greater effect of reducing the emission amount of hydrocarbon is achieved.

TABLE 1

| | First layer | | | Second layer | | | Third layer | | | |
| --- | --- | --- | --- | --- | --- | --- | --- | --- | --- | --- |
| | Material | Thickness (μm) | Thermal decomposition temperature (° C.) | Material | Thickness (μm) | Thermal decomposition temperature (° C.) | Material | Thickness (μm) | Thermal decomposition temperature (° C.) | Total thickness (μm) |
| Example 1 | Polyimide | 90 | 450 | Polyimide | 10 | 450 | — | — | — | 100 |
| Example 2 | Polyimide | 90 | 450 | Polyimide | 10 | 450 | $SiO_2$ | 0.38 | 1650 | 100.4 |
| Example 3 | Polyimide | 90 | 450 | Polyimide | 10 | 450 | DLC | 0.1 | 500 | 100.1 |
| Example 4 | Polyimide | 190 | 450 | Polyimide | 10 | 450 | $SiO_2$ | 0.38 | 1650 | 200.4 |
| Example 5 | Polyimide | 90 | 450 | Polyimide | 10 | 450 | — | — | — | 100 |
| Example 6 | Polyamide-imide | 190 | 250 | Polyamide-imide | 10 | 250 | — | — | — | 200 |
| Comparative Example 1 | — | — | — | — | — | — | — | — | — | 0 |
| Comparative Example 2 | — | — | — | — | — | — | — | — | — | 0 |
| Comparative Example 3 | Anodized aluminum | 70 | 2000 | — | — | — | $SiO_2$ | 0.54 | 1650 | 70.54 |
| Comparative Example 4 | Zirconia | 500 | 2700 | — | — | — | — | — | — | 500 |

TABLE 1-continued

| | First layer | | | Second layer | | | Third layer | | | Total thickness (μm) |
|---|---|---|---|---|---|---|---|---|---|---|
| | Material | Thickness (μm) | Thermal decomposition temperature (°C.) | Material | Thickness (μm) | Thermal decomposition temperature (°C.) | Material | Thickness (μm) | Thermal decomposition temperature (°C.) | |
| Comparative Example 5 | Polyimide | 50 | 400 | — | — | — | — | — | — | 50 |
| Comparative Example 6 | Polyimide | 100 | 450 | — | — | — | — | — | — | 100 |

| | First layer | | | | | Third layer Thermal conductivity (W/(m·K)) | Surface roughness (μmRa) | Gas adsorption area per unit projected area (m²/m²) | Cooling response test (°C.) | Hydrocarbon concentration (ppm) |
|---|---|---|---|---|---|---|---|---|---|---|
| | Thermal conductivity (W/(m·K)) | Volumetric specific heat (kJ/(m³·K)) | Density (kg/m) | Specific heat capacity (kJ/(kg·K)) | Porosity (%) | | | | | |
| Example 1 | 0.08 | 650 | 650 | 1.0 | 53.6 | — | 0.08 | 1.25 | 32.3 | 375 |
| Example 2 | 0.08 | 650 | 650 | 1.0 | 53.6 | 1.38 | 0.063 | 1.00 | 38.5 | 397 |
| Example 3 | 0.08 | 650 | 650 | 1.0 | 53.6 | 3000 | 0.02 | 1.00 | 38.5 | 503 |
| Example 4 | 0.08 | 650 | 650 | 1.0 | 53.6 | 1.38 | 0.063 | 1.00 | 38.5 | 397 |
| Example 5 | 0.2 | 991 | 990 | 1.0 | 30.1 | — | 0.08 | 1.25 | 22.9 | 375 |
| Example 6 | 0.17 | 1173 | 780 | 1.5 | 43 | — | 0.15 | 2.34 | 28 | 317 |
| Comparative Example 1 | — | — | — | — | — | — | 4.27 | 2.03 | 2.2 | 0 |
| Comparative Example 2 | — | — | — | — | — | — | 0.045 | 1 | 2.2 | 428 |
| Comparative Example 3 | 0.56 | 1030 | 1000 | 1.03 | 12.7 | 1.38 | 4.92 | 20.5 | 17.7 | −5 |
| Comparative Example 4 | 1.36 | 2572 | 5000 | 0.51 | 10 | — | 14.1 | 350.6 | 2.2 | −102 |
| Comparative Example 5 | 0.34 | 1582 | 1430 | 1.11 | 0 | — | 0.15 | 1.25 | 11.1 | 375 |
| Comparative Example 6 | 0.08 | 650 | 650 | 1.0 | 53.6 | — | 0.15 | 119 | 32 | −61 |

The results shown in Table 1 and Table 2 revealed that the heat shield components in Examples 1 to 6 achieved 22.9° C. or greater for the evaluation of the cooling response test, and 317 ppm or greater for the evaluation of the decreased amount of the concentration of hydrocarbon, indicating the high heat-insulating properties and the great effect of reducing the emission amount of hydrocarbon.

In contrast, the heat shield components in Comparative Examples 1 to 6 could not achieve good results of the cooling response test or the decreased amount of the concentration of hydrocarbon, as compared with Examples 1 to 6. The comparison revealed that the heat shield components in Examples can achieve the higher heat-insulating properties and the greater effect of reducing the emission amount of hydrocarbon.

While the present invention has been described above by reference to the examples, it should be understood that the present invention is not intended to be limited to the above descriptions, and various alternatives and modifications will be apparent to those skilled in the art.

The heat shield component according to the present invention includes the substrate and the heat shield film. The heat shield film includes the first layer having the thermal conductivity and the volumetric specific heat each set to a predetermined value or lower, and the second layer arranged to provide the closed pores between the first layer and the second layer. The surface roughness on the top surface of the heat shield film is a predetermined value or lower. The heat shield component according to the present embodiment can improve the heat-insulating properties and the effect of reducing the emission amount of hydrocarbon in an internal combustion engine, for example.

REFERENCE SIGNS LIST

5 SUBSTRATE
7 HEAT SHIELD FILM
7a TOP SURFACE
10 FIRST LAYER
15 PORE
20 SECOND LAYER
25 CLOSED PORE
30 THIRD LAYER
100 HEAT SHIELD COMPONENT

The invention claimed is:
1. A heat shield component comprising:
a substrate; and
a heat shield film arranged on the substrate,
the heat shield film including:
a first layer arranged on the substrate, including a plurality of closed pores, and having a thermal conductivity of 0.3 W/(m·K) or less and a volumetric specific heat of 1200 kJ/(m³·K) or less; and
a second layer arranged on the first layer to provide closed pores between the first layer and the second layer,
wherein the heat shield film has a surface roughness on a top surface which is 1.5 μm Ra or less, and wherein the second layer is formed of a material comprising a polyimide, polyamide, or a polyamide-imide, and wherein an average diameter of the plurality of pores is 3 µm to 200 µm.

2. The heat shield component according to claim 1, wherein a gas adsorption area per unit projected area on the top surface of the heat shield film is 20 m²/m² or smaller.

3. The heat shield component according to claim 1, wherein the thermal conductivity is 0.2 W/(m·K) or less, and the volumetric specific heat is 1000 kJ/(m³·K) or less.

4. The heat shield component according to claim 1, wherein the thermal conductivity is 0.1 W/(m·K) or less, and the volumetric specific heat is 1000 kJ/(m³·K) or less.

5. The heat shield component according to claim 1, wherein a thickness of the first layer is in a range of $6.7119e^{(0.0063 \times \text{the thermal conductivity} \times \text{the volumetric specific heat})}$ µm to $67.119e^{(0.0063 \times \text{the thermal conductivity} \times \text{the volumetric specific heat})}$ µm.

6. The heat shield component according to claim 1, wherein the surface roughness is 0.1 µm Ra or less.

7. The heat shield component according to claim 1, wherein a thickness of the second layer is 1 µm or greater and 10 µm or less.

8. The heat shield component according to claim 1, wherein the heat shield film further includes a third layer arranged on the second layer and having a thermal decomposition temperature of 500° C. or higher.

9. The heat shield component according to claim 8, wherein the third layer is formed of an inorganic film mainly including silica.

10. The heat shield component according to claim 8, wherein the third layer is an amorphous carbon-based film.

11. The heat shield component according to claim 1, wherein the first layer and the second layer each have a thermal decomposition temperature of 350° C. or higher.

12. The heat shield component according to claim 1, wherein the first layer and the second layer are each formed of a material including polyimide.

13. The heat shield component according to claim 1, wherein a porosity of the first layer is 30% or greater.

14. The heat shield component according to claim 1, wherein a porosity of the first layer is 50% or greater.

15. The heat shield component according to claim 1, wherein the surface roughness of the heat shield on the top surface is 0.5 µm Ra or less and is an exposed surface.

* * * * *